United States Patent
Kim et al.

(10) Patent No.: US 10,637,095 B2
(45) Date of Patent: Apr. 28, 2020

(54) METHOD FOR PREPARING SOLID ELECTROLYTE FOR ALL-SOLID-STATE LITHIUM SECONDARY BATTERY

(71) Applicant: TDL CO., LTD., Gwangju (KR)

(72) Inventors: Ho Sung Kim, Gwangju (KR); Min-young Kim, Gwangju (KR); Seung Hoon Yang, Gwangju (KR); Jinsub Lim, Gwangju (KR); Duck Rye Chang, Gwangju (KR); Jong Ho Lee, Gwangju (KR)

(73) Assignee: TDL CO., LTD., Gwangju (KR)

( * ) Notice: Subject to any disclaimer, the term of this patent is extended or adjusted under 35 U.S.C. 154(b) by 0 days.

(21) Appl. No.: 15/754,630

(22) PCT Filed: Aug. 23, 2016

(86) PCT No.: PCT/KR2016/009289
§ 371 (c)(1),
(2) Date: Feb. 23, 2018

(87) PCT Pub. No.: WO2017/047939
PCT Pub. Date: Mar. 23, 2017

(65) Prior Publication Data
US 2018/0248223 A1 Aug. 30, 2018

(30) Foreign Application Priority Data
Sep. 18, 2015 (KR) .................. 10-2015-0132466

(51) Int. Cl.
*H01M 10/0562* (2010.01)
*H01M 10/0525* (2010.01)
(Continued)

(52) U.S. Cl.
CPC ...... *H01M 10/0562* (2013.01); *H01M 10/052* (2013.01); *H01M 10/0525* (2013.01); *H01M 10/0585* (2013.01); *H01M 2300/0071* (2013.01)

(58) Field of Classification Search
CPC .......... H01M 10/0562; H01M 10/052; H01M 10/0525; H01M 10/0585; H01M 2300/0071
See application file for complete search history.

(56) References Cited

U.S. PATENT DOCUMENTS

2010/0047696 A1\* 2/2010 Yoshida .............. H01M 10/052
429/322
2015/0010829 A1 1/2015 Shin et al.

FOREIGN PATENT DOCUMENTS

CN 104124467 A \* 10/2014
JP 2011-054457 A 3/2011
(Continued)

OTHER PUBLICATIONS

English machine translation of Zhifeng et al. (CN 104124467 A) (Year: 2014).\*
(Continued)

*Primary Examiner* — Stewart A Fraser
(74) *Attorney, Agent, or Firm* — Rabin & Berdo, P.C.

(57) ABSTRACT

Disclosed is a method of preparing a solid electrolyte, which includes (a) preparing a solid electrolyte precursor slurry by subjecting a mixed solution including a metal precursor solution, containing a lanthanum precursor, a zirconium precursor and an aluminum precursor, a complexing agent, and a pH controller to coprecipitation, (b) preparing a solid electrolyte precursor by washing and drying the solid electrolyte precursor slurry, (c) preparing a mixture by mixing the solid electrolyte precursor with a lithium source, and (d) preparing an aluminum-doped lithium lanthanum zirconium
(Continued)

oxide (LLZO) solid electrolyte by calcining the mixture, and which is also capable of adjusting the aluminum content of a starting material to thus control sintering properties and of adjusting the composition of a precursor and a lithium source to thus control the crystal structure, thereby improving the ionic conductivity of the solid electrolyte.

18 Claims, 6 Drawing Sheets

(51) Int. Cl.
    *H01M 10/052*      (2010.01)
    *H01M 10/0585*      (2010.01)

(56) References Cited

FOREIGN PATENT DOCUMENTS

| | | |
|---|---|---|
| JP | 4779988 B2 | 9/2011 |
| JP | 2012-224520 A | 11/2012 |
| JP | 2013-184848 A | 9/2013 |
| JP | 2013-256435 A | 12/2013 |
| KR | 10-2014-0083854 A | 7/2014 |
| KR | 10-2015-0005136 A | 1/2015 |
| KR | 10-2015-0005413 A | 1/2015 |
| WO | WO2015/002410 A1 | 1/2015 |
| WO | WO2015/163152 A1 | 10/2015 |

OTHER PUBLICATIONS

English machine translation of Myung et al. (KR 20140083854 A) (Year: 2014).*

Tamura, Shinji, Nobuhito Imanaka, and Gin-ya Adachi. "Optimization of Sc3+ ion conduction in NASICON type solid electrolytes." Chemistry Letters 30.7 (2001): 672-673. (Year: 2001).*

Janani, Narayanasamy, et al. "Influence of sintering additives on densification and Li+ conductivity of Al doped Li 7 La 3 Zr 2 O 12 lithium garnet." Rsc Advances 4.93 (2014): 51228-51238. (Year: 2014).*

Ying Jin et al., "Al-doped $Li_7La_3Zr_2O_{12}$ synthesized by a polymerized complex method", Journal of Power Sources, 2011, pp. 8683-8687, vol. 196.

* cited by examiner (a) : Example 1, (b) : Example 2, (c) : Example 3, (d) : Example 4

(a) : Example 5, (b) : Example 6, (c) : Example 7, (d) Example 8

(a) : Example 9, (b) : Example 10, (c) : Example 11

(a): Example 9, (b): Example 12

METHOD FOR PREPARING SOLID ELECTROLYTE FOR ALL-SOLID-STATE LITHIUM SECONDARY BATTERY

TECHNICAL FIELD

The present invention relates to a method of preparing a solid electrolyte for use in an all-solid-state lithium secondary battery, and more particularly to a method of preparing a solid electrolyte, in which the aluminum content of a starting material is adjusted to thus control sintering properties and the composition of a precursor and a lithium source is adjusted to thus control the crystal structure, thereby improving ionic conductivity of the solid electrolyte.

BACKGROUND ART

Since lithium secondary batteries have great electrochemical capacity, high operating potential and superior charge/discharge cycles, demand therefor in the fields of portable information terminals, portable electronic devices, small power storage devices for home use, motorcycles, electric cars, hybrid electric cars, and the like is increasing. Hence, improvements to the safety and performance of lithium secondary battery are required in response to the proliferation of such applications.

Conventional lithium secondary batteries using a liquid electrolyte are problematic because of poor stability owing to easy ignition upon exposure to moisture in the air. Such problems pertaining to stability come to the fore as electric cars are becoming popular.

In order to improve safety, thorough research is thus ongoing these days into all-solid-state secondary batteries using a solid electrolyte composed of a non-combustible inorganic material. All-solid-state secondary batteries, having stability, high energy density, high power output, long life, simple manufacturing processes, large/small sizes, and low prices, are receiving attention as a next-generation secondary battery.

An all-solid-state secondary battery is configured to include a cathode, a solid electrolyte layer and an anode, in which the solid electrolyte of the solid electrolyte layer has to possess high ionic conductivity and low electronic conductivity. Furthermore, a solid electrolyte is contained in the cathode and the anode as electrode layers, and the solid electrolyte used for the electrode layers is ideally formed of a conductive material mixture having both high ionic conductivity and high electronic conductivity.

A solid electrolyte that satisfies the requirements of the solid electrolyte layer of the all-solid-state secondary battery includes a sulfide, an oxide, or the like. In particular, a sulfide-based solid electrolyte is problematic in terms of production of a resistance component through the interfacial reaction with a cathode active material or an anode active material, high moisture absorption properties, and also generation of a hydrogen sulfide ($H_2S$) gas that is poisonous.

Japanese Patent No. 4,779,988 discloses an all-solid-state lithium secondary battery having a layer structure comprising a cathode/a solid electrolyte layer/an anode, the solid electrolyte layer being formed of a sulfide.

Known examples of an oxide-based solid electrolyte may include LLTO ($Li_{3x}La_{2/(3-x)}TiO_3$), LLZO ($Li_7La_3Zr_2O_{12}$), and the like, among which LLZO, having relatively high grain boundary resistance but superior potential window properties compared to LLTO, is receiving attention as a prominent material.

LLZO, having high ionic conductivity, low reactivity with an electrode material, a wide potential window (0-6V), and the like, is disadvantageous because processing conditions are difficult to control owing to the volatilization of lithium (Li) during a sintering process and also because actual application thereof is difficult because of complicated manufacturing processes due to the difficulty in sintering thereof. Moreover, there is a significant difference in ionic conductivity depending on the crystal structure, and therefore the development of a technique for adjusting the compositions of starting materials, sintering properties, and the like to thereby control the crystal structure of LLZO is required.

DISCLOSURE

Technical Problem

Accordingly, the present invention has been made keeping in mind the problems encountered in the related art, and the present invention is intended to provide a method of preparing a solid electrolyte having improved ionic conductivity, in which the aluminum content of a starting material is adjusted to thus control sintering properties and the composition of a precursor and a lithium source is adjusted to thus control the crystal structure.

Technical Solution

Therefore, an aspect of the present invention provides:
a method of preparing a solid electrolyte, comprising: (a) preparing a solid electrolyte precursor slurry by subjecting a mixed solution comprising a metal precursor solution, including a lanthanum precursor, a zirconium precursor and an aluminum precursor, a complexing agent, and a pH controller to coprecipitation; (b) preparing a solid electrolyte precursor by washing and drying the solid electrolyte precursor slurry; (c) preparing a mixture by mixing the solid electrolyte precursor with a lithium source; and (d) preparing an aluminum-doped lithium lanthanum zirconium oxide (LLZO) solid electrolyte by calcining the mixture.

The LLZO solid electrolyte may be represented by Chemical Formula 1 below.

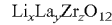 [Chemical Formula 1]

In Chemical Formula 1, $6 \leq x \leq 9$, $2 \leq y \leq 4$, $1 \leq z \leq 3$.

The aluminum-doped lithium lanthanum zirconium oxide (LLZO) solid electrolyte may include lithium and aluminum at a weight ratio ranging from 100:0.01 to 100:20.

The coprecipitation in step (a) may be carried out in a batch manner.

The coprecipitation in step (a) may be carried out in a Taylor vortex state.

Step (a) may be performed using a Couette-Taylor vortex reactor.

The Taylor number in the Taylor vortex state may be in the range from 550 to 1,500.

The Taylor number in the Taylor vortex state may be in the range from 640 to 800.

The lanthanum precursor may be lanthanum nitrate, the zirconium precursor may be zirconium nitrate, and the aluminum precursor may be aluminum nitrate.

The lanthanum nitrate may be $La(NO_3)_3 \cdot 6H_2O$, the zirconium nitrate may be $ZrO(NO_3)_2 \cdot 2H_2O$, and the aluminum nitrate may be $Al(NO_3)_3 \cdot 9H_2O$.

The La:Zr:Al molar ratio in the metal precursor solution may be a:b:c, a ranging from 2 to 4, b ranging from 1 to 3, and c ranging from 0.2 to 0.4.

The La:Zr:Al molar ratio in the metal precursor solution may be a:b:c, a ranging from 2 to 4, b ranging from 1 to 3, and c ranging from 0.2 to 0.3.

The lithium content of the lithium source in step (c) may be 101 to 112 parts by weight based on 100 parts by weight of lithium of the solid electrolyte, which is the product of step (d).

The lithium content of the lithium source in step (c) may be 101 to 108 parts by weight based on 100 parts by weight of lithium of the solid electrolyte, which is the product of step (d).

The calcining in step (d) may be performed at 600 to 1,000° C.

The calcining may be performed for 1 to 12 hr.

The calcining may be performed for 1 to 9 hr.

The method of the invention may further include (e) preparing a sintered solid electrolyte by sintering the aluminum-doped LLZO solid electrolyte, after step (d).

The sintering may be performed at 900 to 1,300° C.

The solid electrolyte may have at least one structure selected from among a cubic structure and a tetragonal structure.

The solid electrolyte may have a single-phase cubic structure.

Advantageous Effects

According to the present invention, the method of preparing a solid electrolyte is capable of adjusting the aluminum content of a starting material to thus control sintering properties and also of adjusting the composition of a precursor and a lithium source to thus control the crystal structure, thereby improving the ionic conductivity of the solid electrolyte.

BEST MODE

Hereinafter, embodiments of the present invention are described in detail with reference to the appended drawings so as to be easily performed by a person having ordinary skill in the art.

However, the following description does not limit the present invention to specific embodiments, and moreover, descriptions of known techniques, even if they are pertinent to the present invention, are considered unnecessary and may be omitted insofar as they would make the characteristics of the invention unclear.

The terms herein are used to explain specific embodiments and are not intended to limit the present invention. Unless otherwise stated, the singular expression includes a plural expression. In this application, the terms "include" or "have" are used to designate the presence of features, numbers, steps, operations, elements, parts, or combinations thereof described in the specification, and should be understood as not excluding the presence or additional possible presence of one or more different features, numbers, steps, operations, elements, parts, or combinations thereof.

Figure 1:
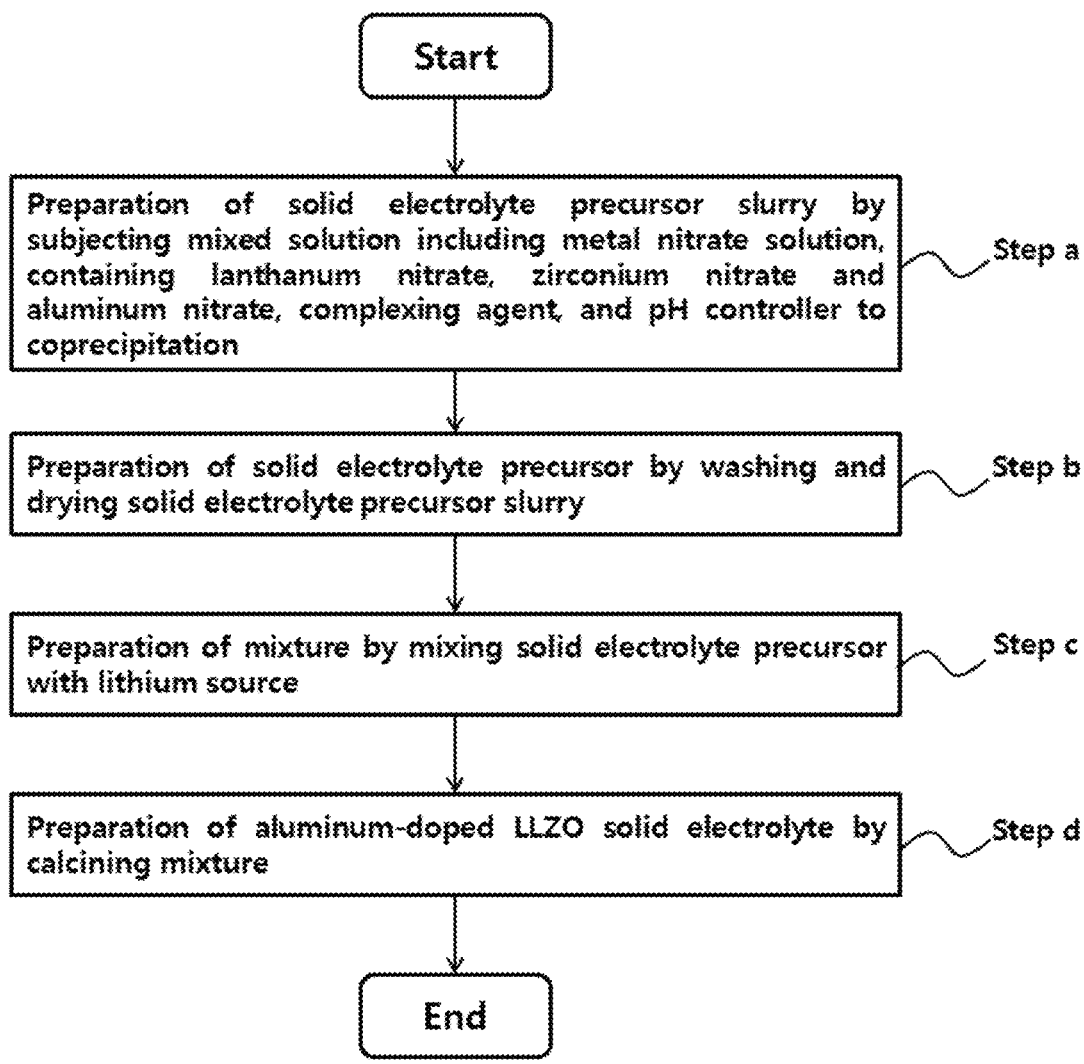
FIG. 1 is a flowchart showing a process of preparing a solid electrolyte according to the present invention.

FIG. 1 is a flowchart showing the process of preparing a solid electrolyte according to the present invention. Here, the lanthanum precursor, the zirconium precursor and the aluminum precursor are exemplified by lanthanum nitrate, zirconium nitrate, and aluminum nitrate, respectively, but the present invention is not limited thereto.

Below is a detailed description of the method of preparing the solid electrolyte according to the present invention with reference to FIG. 1, which is set forth to illustrate but is not to be construed as limiting the present invention, and the present invention is defined only by the claims, which will be set forth later.

Specifically, a metal precursor solution including the lanthanum precursor, the zirconium precursor and the aluminum precursor, a complexing agent, and a pH controller are mixed and coprecipitated, thus preparing a solid electrolyte precursor slurry (step a).

The lanthanum precursor may be lanthanum nitrate, the zirconium precursor may be zirconium nitrate, and the aluminum precursor may be aluminum nitrate. The lanthanum nitrate may be $La(NO_3)_3 \cdot 6H_2O$, the zirconium nitrate may be $ZrO(NO_3)_2 \cdot 2H_2O$, and the aluminum nitrate may be $Al(NO_3)_3 \cdot 9H_2O$.

The metal precursor solution may be an aqueous solution.

The La:Zr:Al molar ratio of the metal precursor solution may be a:b:c, a ranging from 2 to 4, b ranging from 1 to 3, and c ranging from 0.2 to 0.4.

When the value of c is adjusted, the crystal structure of the solid electrolyte may be controlled and the sintering properties thereof may be improved. If the value of c is less than 0.2, Al is not sufficiently doped, making it difficult to control the crystal structure and the sintering properties, thus decreasing ionic conductivity. On the other hand, if the value of c exceeds 0.4, the sintering density of the solid electrolyte may decrease to thus lower ionic conductivity.

The value of a is preferably 2.5 to 3.5, and more preferably 2.8 to 3.2. The value of b is preferably 1.5 to 2.5, and more preferably 1.8 to 2.2. The value of c is preferably 0.2 to 0.3, and more preferably 0.23 to 0.26.

Examples of the complexing agent may include ammonia water, sodium hydroxide, etc.

The pH controller functions to adjust the pH of the mixed solution to fall within the range from 10 to 12, preferably 10.5 to 11.5, and more preferably 10.8 to 11.2.

The pH controller may include, but is not limited to, sodium hydroxide, ammonia, etc. Any pH controller may be used, so long as it does not affect the preparation of the solid oxide and is able to adjust the pH of the mixed solution.

The coprecipitation may be performed in a batch manner or in a Taylor vortex state, and is preferably carried out using a Couette-Taylor vortex reactor.

The Taylor number of the Taylor vortex state is in the range from 550 to 1,500, preferably 630 to 800, and more preferably 640 to 700.

Figure 2:
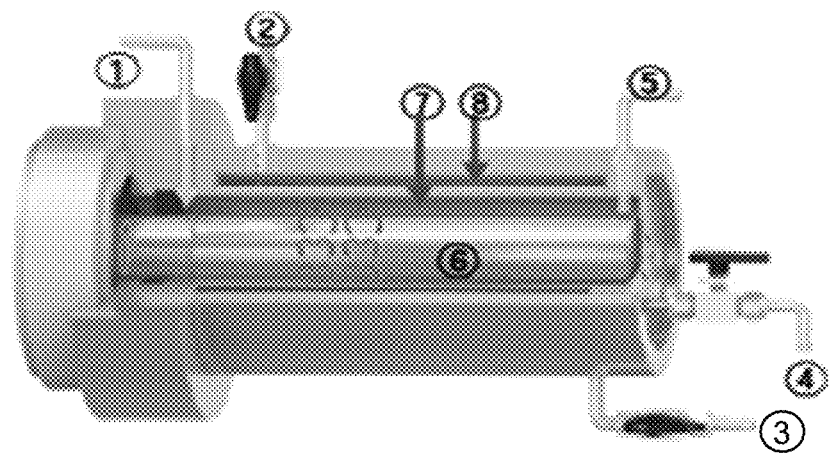
FIG. 2 schematically shows a Couette-Taylor vortex reactor.

FIG. 2 schematically shows the Taylor vortex reactor.

With reference to FIG. 2, the Couette-Taylor vortex reactor for a Couette-Taylor vortex reaction includes an outer fixed cylinder and an inner rotary cylinder that rotates therein. The inner rotary cylinder has a rotational axis that is coincident with the longitudinal axis of the outer fixed cylinder. The inner rotary cylinder and the outer fixed cylinder are spaced apart from each other by a predetermined interval and thus a fluid passage through which a reaction liquid flows is formed between the inner rotary cylinder and the outer fixed cylinder. When the inner rotary cylinder rotates, the fluid, which is located at the inner rotary cylinder in the fluid passage, tends to flow in the direction of the outer fixed cylinder by means of centrifugal force, whereby the fluid becomes unstable to thus form vortices in a ring-pair array rotating regularly and in opposite directions along the rotational axis, which are called a Taylor or Couette-Taylor vortex. The Couette-Taylor vortex may promote a coprecipitation reaction, thereby efficiently preparing a precursor compared to when using a conventional coprecipitation reactor.

Here, the Couette-Taylor reactor makes it possible to distinguish the characteristics of the fluid flow and to define the corresponding region depending on each characteristic using a dimensionless parameter, namely a Taylor number (Ta). The Taylor number (Ta) is represented by the function of the Reynolds number (Re) and is expressed by Equation 1 below.

$$Re = \frac{\omega r_i d}{v} \quad Ta = \frac{d}{r_i} \quad \text{[Equation 1]}$$

In Equation 1, w indicates the angular speed of the inner cylinder, $r_i$ is the radius of the inner cylinder, d is the distance between two cylinders parallel to each other, and v is the dynamic viscosity. Typically, the value of Ta is adjusted using revolutions per minute (RPM), representing the angular speed of the inner cylinder. Generally, when a fluid flows between two planar plates, a Couette flow occurs due to shear stress. Similarly, a Couette flow also occurs at low RPM between the two cylinders. However, when the RPM of the inner cylinder exceeds a predetermined threshold, a Couette flow is converted into a new steady state, namely a Couette-Taylor flow, and a Taylor vortex, which cannot be observed in a Couette flow, occurs. The Taylor vortex is made up of pairs of two vortices, which are line symmetrical and located in a toroidal direction. Accordingly, a vortex that rotates in a counterclockwise direction is present beside a vortex that rotates in a clockwise direction, and thus these vortices affect each other. In a Couette-Taylor flow, when the predetermined RPM is increased, a new flow is created due to an increase in the instability of the Taylor vortex. Here, the Taylor vortex has an azimuthal wavenumber. This flow is referred to as a wavy vortex flow, and the mixing effect thereof may be greater than that of the Couette-Taylor flow.

Next, the solid electrolyte precursor slurry is washed and dried, thus preparing a solid electrolyte precursor (step b).

The precursor slurry is washed with water, and thus the solid electrolyte precursor may have a pH of about 7.

The solid electrolyte precursor is mixed with a lithium source, thus preparing a mixture (step c).

Examples of the lithium source may include LiOH.H$_2$O, LiOH, LiNO$_3$, LiCO$_3$, etc.

The lithium of the lithium source may be added in excess, taking into consideration the amount of lithium that evaporates upon sintering at 700 to 1,200° C., and may be contained in the mixture so as to fall in the range of 101 to 112 parts by weight, preferably 101 to 108 parts by weight, and more preferably 102 to 107 parts by weight, based on 100 parts by weight of lithium of a final product, namely a solid electrolyte.

Specifically, lithium may be contained in the above mixture so that the amount thereof is greater by 1 to 12 wt %, preferably 1 to 8 wt %, and more preferably 2 to 7 wt % than the amount of lithium element in the solid electrolyte that is finally produced.

When the lithium content of the lithium source of the mixture is adjusted in this way, the ionic conductivity and crystal structure of the solid electrolyte may be controlled. If the lower limit or the upper limit of the lithium content of the lithium source of the mixture, which is contained in excess relative to the amount of lithium element in the solid electrolyte that is finally produced, is less than 1 wt % or is more than 12 wt %, it may become difficult to accurately control the lithium composition of the solid electrolyte.

The solid electrolyte is preferable when the lithium content is increased. Also, the solid electrolyte may be favorable in terms of ionic conductivity when having a cubic structure, and the ionic conductivity thereof may decrease in the case of a tetragonal structure.

As necessary, the precursor may be pulverized before being mixed with the lithium source.

The pulverization and the mixing may be performed using a ball mill process.

Finally, the mixture is calcined, thus preparing an aluminum-doped lithium lanthanum zirconium oxide (LLZO) solid electrolyte (step d).

The LLZO solid electrolyte may be represented by Chemical Formula 1 below.

$$Li_xLa_yZr_zO_{12} \quad \text{[Chemical Formula 1]}$$

In Chemical Formula 1, 6≤x≤9, 2≤y≤4, 1≤z≤3.

The aluminum-doped lithium lanthanum zirconium oxide (LLZO) solid electrolyte includes lithium and aluminum at a weight ratio ranging from 100:0.01 to 100:20, preferably 100:0.1 to 100:18, and more preferably 100:0.1 to 100:15.

The calcination process may be performed at 600 to 1,000° C., preferably 800 to 950° C., and more preferably 880 to 920° C.

The calcination process may be performed for 1 to 12 hr, preferably 1 to 9 hr, and more preferably 1 to 7 hr. However, the calcination time is not necessarily limited thereto, and may vary depending on the calcination temperature.

As necessary, the aluminum-doped LLZO solid electrolyte may be sintered to give a sintered solid electrolyte (step e).

The sintering process may be performed at 900 to 1,300° C., preferably 1,000 to 1,250° C., and more preferably 1,100 to 1,220° C.

The sintering process may be performed for 3 to 7 hr, preferably 4 to 6 hr, and more preferably 4 hr 30 min to 5 hr 30 min. However, the sintering time is not necessarily limited thereto, and may vary depending on the sintering temperature.

The solid electrolyte and the sintered solid electrolyte may have at least one structure selected from among a cubic structure and a tetragonal structure, and preferably the solid electrolyte and the sintered solid electrolyte have a single-phase cubic structure.

As described above, the solid electrolyte preferably has a cubic structure in order to achieve desired ionic conductivity, and the ionic conductivity thereof may decrease in the case of a tetragonal structure.

Mode for Invention

EXAMPLES

A better understanding of the present invention will be given through the following Examples, which are set forth to illustrate but are not to be construed to limit the scope of the present invention.

Example 1: Preparation of Solid Electrolyte

Lanthanum nitrate ($La(NO_3)_3 \cdot 6H_2O$), zirconium nitrate ($ZrO(NO_3)_2 \cdot 2H_2O$) and aluminum nitrate ($Al(NO_3)_3 \cdot 9H_2O$) were dissolved in distilled water so that the molar ratio of La:Zr:Al, which was the starting material, was 3:2:0.25, thus preparing a starting material solution in which the concentration of the starting material was 1 M.

A solid electrolyte was prepared using a Couette-Taylor vortex reactor as shown in FIG. 2. The Couette-Taylor vortex reactor includes a solution inlet 1, a temperature control solution outlet 2, a temperature control solution inlet 3, a reaction solution drain portion 4, a reactant (slurry type) outlet 5, a stirring rod 6, a solution reaction portion 7, and a reaction solution temperature control portion 8. The starting material solution, 0.6 mol of ammonia water as a complexing agent, and an appropriate amount of sodium hydroxide aqueous solution were added via the inlet 1 of the Couette-Taylor vortex reactor, thus obtaining a mixed solution having a pH of 11, which was then subjected to coprecipitation at a reaction temperature of 25° C. for 4 hr at a stirring rate of the stirring rod of 1,300 rpm to give a precursor slurry in a liquid slurry phase, which was then discharged through the outlet 5. The Taylor number in the coprecipitation reaction of the Couette-Taylor vortex reactor was 640 or more.

The precursor slurry was washed with purified water and dried overnight. The dried precursor was pulverized using a ball mill, added with an excess of $LiOH \cdot H_2O$, and mixed together using a ball mill, thus preparing a mixture. $LiOH \cdot H_2O$ of the mixture was added (3 wt % in excess) so that the Li content of $LiOH \cdot H_2O$ was 103 parts by weight based on 100 parts by weight of Li of the produced solid electrolyte. The mixture was calcined at 900° C. for 2 hr and then pulverized, thereby yielding a solid electrolyte.

Example 2: Preparation of Solid Electrolyte

A solid electrolyte was prepared in the same manner as in Example 1, with the exception that $LiOH \cdot H_2O$ of the mixture was added (5 wt % in excess) so that the Li content of $LiOH \cdot H_2O$ was 105 parts by weight based on 100 parts by weight of Li of the produced solid electrolyte.

Example 3: Preparation of Solid Electrolyte

A solid electrolyte was prepared in the same manner as in Example 1, with the exception that $LiOH \cdot H_2O$ of the mixture was added (7 wt % in excess) so that the Li content of $LiOH \cdot H_2O$ was 107 parts by weight based on 100 parts by weight of Li of the produced solid electrolyte.

Example 4: Preparation of Solid Electrolyte

A solid electrolyte was prepared in the same manner as in Example 1, with the exception that $LiOH \cdot H_2O$ of the mixture was added (10 wt % in excess) so that the Li content of $LiOH \cdot H_2O$ was 110 parts by weight based on 100 parts by weight of Li of the produced solid electrolyte.

Example 5: Preparation of Sintered Solid Electrolyte

A sintered solid electrolyte was prepared by sintering the solid electrolyte of Example 1 at 1,200° C. for 5 hr.

Example 6: Preparation of Sintered Solid Electrolyte

A sintered solid electrolyte was prepared by sintering the solid electrolyte of Example 2 at 1,200° C. for 5 hr.

Example 7: Preparation of Sintered Solid Electrolyte

A sintered solid electrolyte was prepared by sintering the solid electrolyte of Example 3 at 1,200° C. for 5 hr.

Example 8: Preparation of Sintered Solid Electrolyte

A sintered solid electrolyte was prepared by sintering the solid electrolyte of Example 4 at 1,200° C. for 5 hr.

Example 9: Preparation of Solid Electrolyte

A solid electrolyte was prepared in the same manner as in Example 1, with the exception that the La:Zr:Al molar ratio of the starting material solution was changed to 3:2:0.3.

Example 10: Preparation of Solid Electrolyte

A solid electrolyte was prepared in the same manner as in Example 9, with the exception that the calcination process was performed for 7 hr rather than 2 hr.

Example 11: Preparation of Solid Electrolyte

A solid electrolyte was prepared in the same manner as in Example 9, with the exception that the calcination process was performed for 10 hr rather than 2 hr.

Example 12: Preparation of Sintered Solid Electrolyte

A sintered solid electrolyte was prepared by sintering the solid electrolyte of Example 9 at 1,200° C. for 5 hr.

Example 13: Preparation of Solid Electrolyte

A solid electrolyte ($Li_xLa_yZr_zO_{12}$) was prepared using a batch-type coprecipitation reactor in lieu of the Couette-Taylor vortex reactor. The detailed processes thereof are as follows.

Lanthanum nitrate ($La(NO_3)_3 \cdot 6H_2O$) and zirconium nitrate ($ZrO(NO_3)_2 \cdot 2H_2O$) were dissolved in distilled water so that the molar ratio of La:Zr, which was the starting material, was 3:2, thus preparing a starting material solution in which the concentration of the starting material was 1 M.

The starting material solution was added with 0.6 mol of ammonia water as a complexing agent and an appropriate amount of sodium hydroxide aqueous solution, thus obtaining a mixed solution having a pH of 11.

1 batch of 3 L of the mixed solution was reacted at an impeller speed of 1,000 rpm for 24 hr and aged for 24 hr, thus preparing a precursor.

The precursor was washed with purified water and dried overnight. The dried precursor was pulverized using a ball mill, added with an excess of $LiOH \cdot H_2O$, and mixed together using a ball mill, thus preparing a mixture. $LiOH \cdot H_2O$ of the mixture was added (3 wt % in excess) so that the Li content of $LiOH \cdot H_2O$ was 103 parts by weight based on 100 parts by weight of Li of the produced solid electrolyte. The mixture was calcined at 900° C. for 2 hr and then pulverized, thereby yielding a solid electrolyte.

Example 14: Preparation of Sintered Solid Electrolyte

A sintered solid electrolyte was prepared by sintering the solid electrolyte of Example 13 at 1,200° C. for 5 hr.

The compositions of the starting material solutions of Examples 1 to 14, the lithium content of the lithium source based on 100 parts by weight of Li of the solid electrolyte product, the calcination conditions, and the sintering conditions are summarized in Table 1 below.

sintered solid electrolytes of Examples 6 and 7 exhibited a single-phase cubic structure, the peak intensity of which was great. The sintered solid electrolyte of Example 8 manifested the peak of the cubic structure but did not show a single phase.

Therefore, upon the preparation of the solid electrolyte and the sintered solid electrolyte, the amount of lithium that is used in excess preferably falls in the range of 3 to 7 wt %.

Test Example 2: Ionic Conductivity and Impedance Measurement

Figure 4:
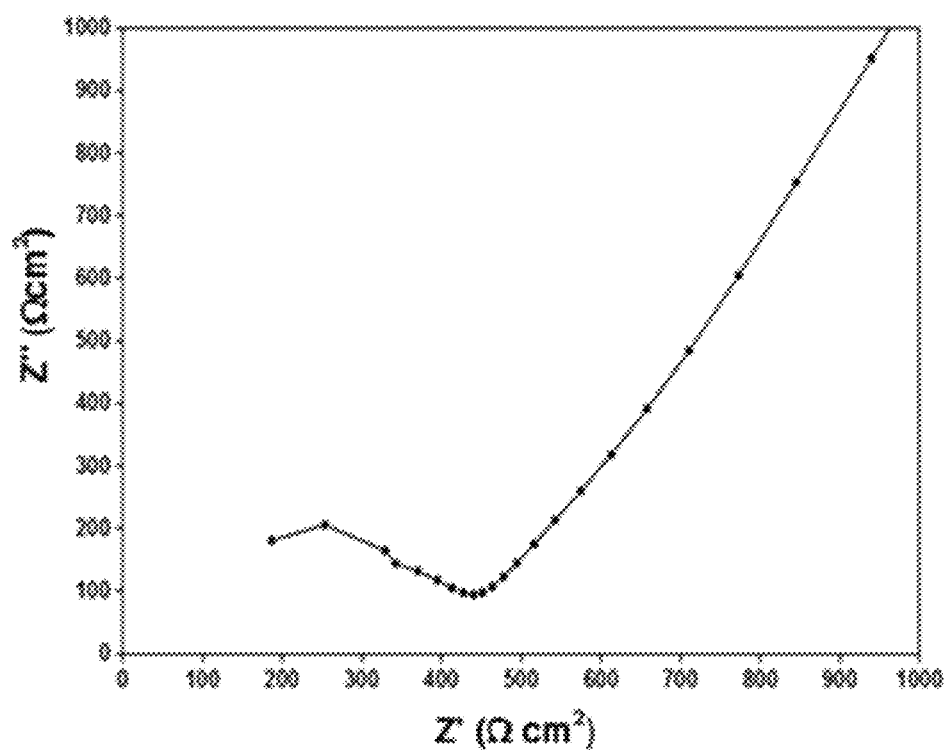
FIG. 4 shows the results of measurement of impedance of the sintered solid electrolyte obtained in Example 5.

The sintered solid electrolytes of Examples 5 to 8 and Example 14 were measured for ionic conductivity through EIS (Electrochemical Impedance Spectroscopy). The results are shown in Table 2 below. The results of measurement of impedance of the sintered solid electrolyte of Example 5 are shown in FIG. 4.

TABLE 1

| No. | Composition of starting material solution (La:Zr:Al) | Lithium content of lithium source (parts by weight) | Calcination temperature (° C.) | Calcination time (hr) | Sintering temperature (° C.) | Sintering time (hr) |
|---|---|---|---|---|---|---|
| Example 1 | 3:2:0.25 | 103 | 900 | 2 | — | — |
| Example 2 | 3:2:0.25 | 105 | 900 | 2 | — | — |
| Example 3 | 3:2:0.25 | 107 | 900 | 2 | — | — |
| Example 4 | 3:2:0.25 | 110 | 900 | 2 | — | — |
| Example 5 | 3:2:0.25 | 103 | 900 | 2 | 1200 | 5 |
| Example 6 | 3:2:0.25 | 105 | 900 | 2 | 1200 | 5 |
| Example 7 | 3:2:0.25 | 107 | 900 | 2 | 1200 | 5 |
| Example 8 | 3:2:0.25 | 110 | 900 | 2 | 1200 | 5 |
| Example 9 | 3:2:0.3 | 103 | 900 | 2 | — | — |
| Example 10 | 3:2:0.3 | 103 | 900 | 7 | — | — |
| Example 11 | 3:2:0.3 | 103 | 900 | 10 | — | — |
| Example 12 | 3:2:0.3 | 103 | 900 | 2 | 1200 | 5 |
| Example 13 | 3:2:0 | 103 | 900 | 2 | — | — |
| Example 14 | 3:2:0 | 103 | 900 | 2 | 1200 | 5 |

TEST EXAMPLE

Test Example 1: Crystal Structure Characteristics Depending on Amount of Lithium that is Used in Excess The XRD results of the solid electrolytes of Examples 1 to 4 are shown in FIG. 3(a), and the XRD results of the sintered solid electrolytes of Examples 5 to 8 are shown in FIG. 3(b).

Figure 3:
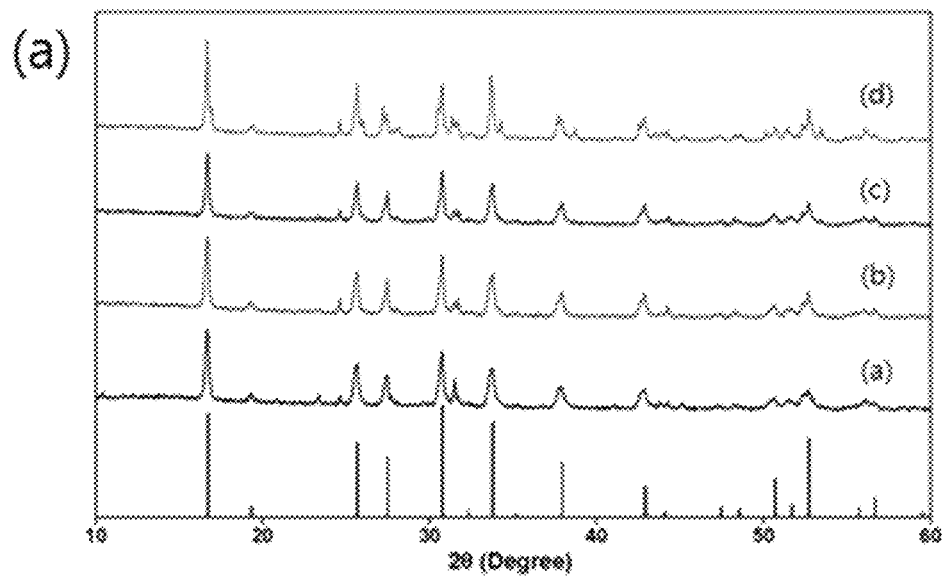
FIG. 3 shows (a) XRD results of solid electrolytes obtained in Examples 1 to 4 and (b) XRD results of sintered solid electrolytes obtained in Examples 5 to 8.
Figure 3:
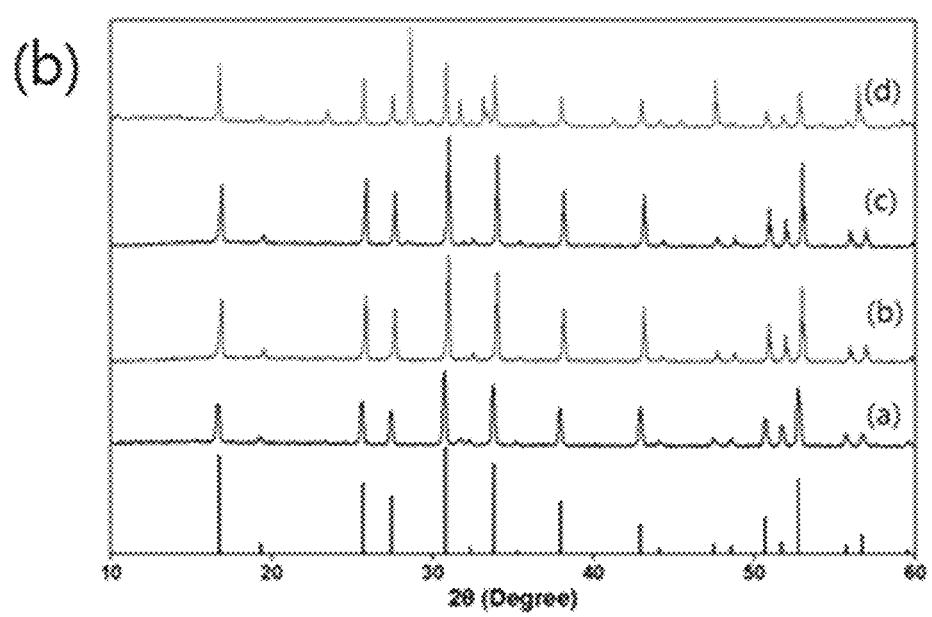

With reference to FIG. 3(a), the solid electrolytes of Examples 1 to 3 can be seen to have a cubic structure. The solid electrolyte of Example 4 did not obviously show the cubic structure compared to the other Examples.

With reference to FIG. 3(b), the sintered solid electrolytes of Examples 5 to 7 can be seen to have a single-phase cubic structure having almost no impurities. In particular, the

TABLE 2

| No. | Total ionic conductivity ($\sigma_t$) (S/cm) |
|---|---|
| Example 5 | $3.03 \times 10^{-4}$ |
| Example 6 | $2.95 \times 10^{-4}$ |
| Example 7 | $2.76 \times 10^{-4}$ |
| Example 8 | $8.12 \times 10^{-5}$ |
| Example 14 | $1.65 \times 10^{-4}$ |

As is apparent from Table 2, the sintered solid electrolytes of Examples 5 to 7 exhibited high total ionic conductivity compared to the sintered solid electrolyte of Example 8. Furthermore, the total ionic conductivity of the sintered solid electrolyte of Example 5 was the greatest. Here, the total ionic conductivity indicates the results calculated with resistance obtained by the summation of grain boundary resistance and bulk resistance of particles.

Thus, the cubic structure is favorable in terms of improving the ionic conductivity of the sintered solid electrolyte. Also, upon the preparation of the solid electrolyte and the sintered solid electrolyte, the amount of lithium that is used in excess is preferably 3 to 7 wt %, and more preferably about 3 wt %. Compared to the sintered solid electrolyte of Example 14 (using a batch-type coprecipitation reactor), the sintered solid electrolytes of Examples 5 to 7 (using a Taylor reactor) exhibited superior ionic conductivity.

With reference to FIG. 4, the resistance of the low-frequency region of the radius in contact with the Z' axis (real number), that is, the resistance obtained before conversion to realize ionic conductivity, was about 450 Ω·cm².

Therefore, the resistance of the sintered solid electrolyte of Example 5 was remarkably low.

Test Example 3: Crystal Structure and Particle Shape Depending on Calcination Time The XRD results of the solid electrolytes of Examples 9 to 11 are shown in FIG. 5, and the SEM results thereof are shown in FIG. 6.

Figure 5:
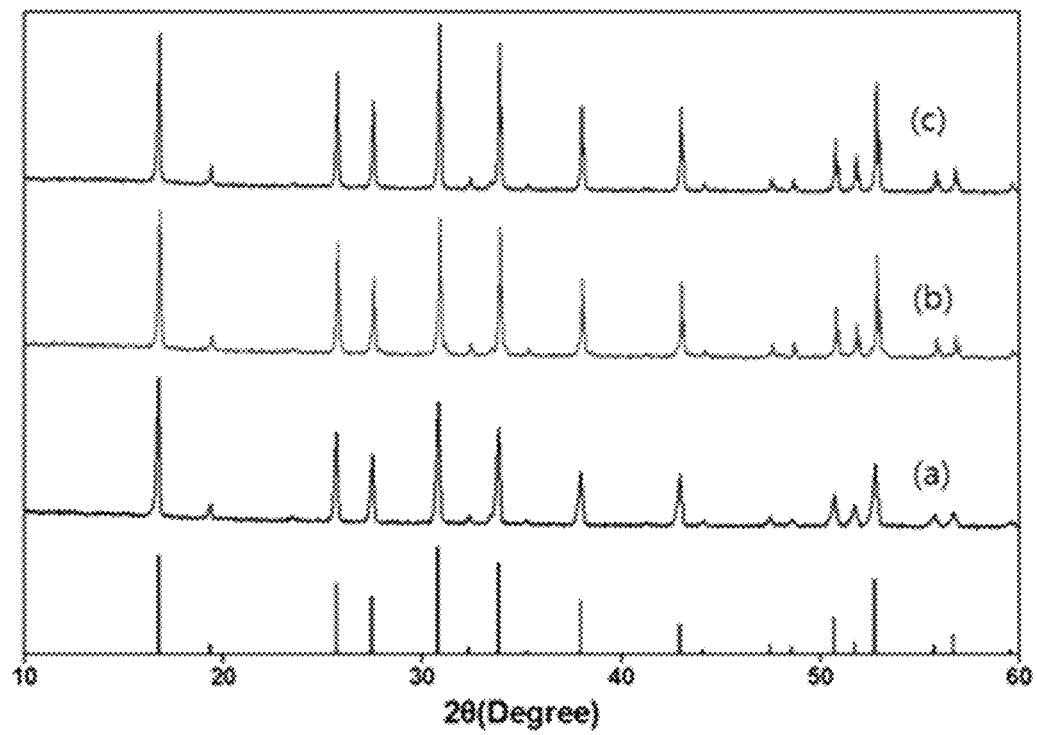
FIG. 5 shows the XRD results of solid electrolytes obtained in Examples 9 to 11.

With reference to FIG. 5, all of the solid electrolytes of Examples 9 to 11 exhibited the same cubic structure having almost no impurities. However, the solid electrolyte of Example 11 (calcination for 10 hr) was slightly decreased in peak intensity compared to the solid electrolyte of Example 10 (calcination for 7 hr).

Figure 6:
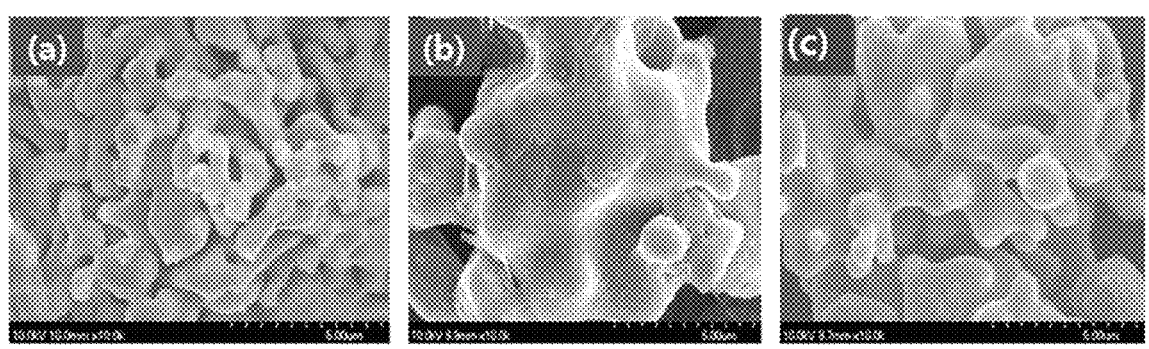
FIG. 6 shows the SEM results of the solid electrolytes obtained in Examples 9 to 11.

With reference to FIG. 6, when the calcination time was increased from 2 hr to 7 hr, the particle size of the solid electrolyte was grown from about 0.5 μm (Example 9, FIG. 6(a)) to 3 μm (Example 10, FIG. 6(b)). In contrast, when the calcination time was increased to 10 hr (Example 11, FIG. 6(c)), the particle size was decreased to about 1 to 2 μm.

In order to ensure a nano particle size within the range in which the crystal structure is maintained, calcination of the solid electrolyte for about 2 to 7 hr is preferable. Moreover, in order to control particles, calcination for about 2 hr is deemed to be much more preferable.

Test Example 4: XRD, Ionic Conductivity and Impedance Measurement

Figure 7:
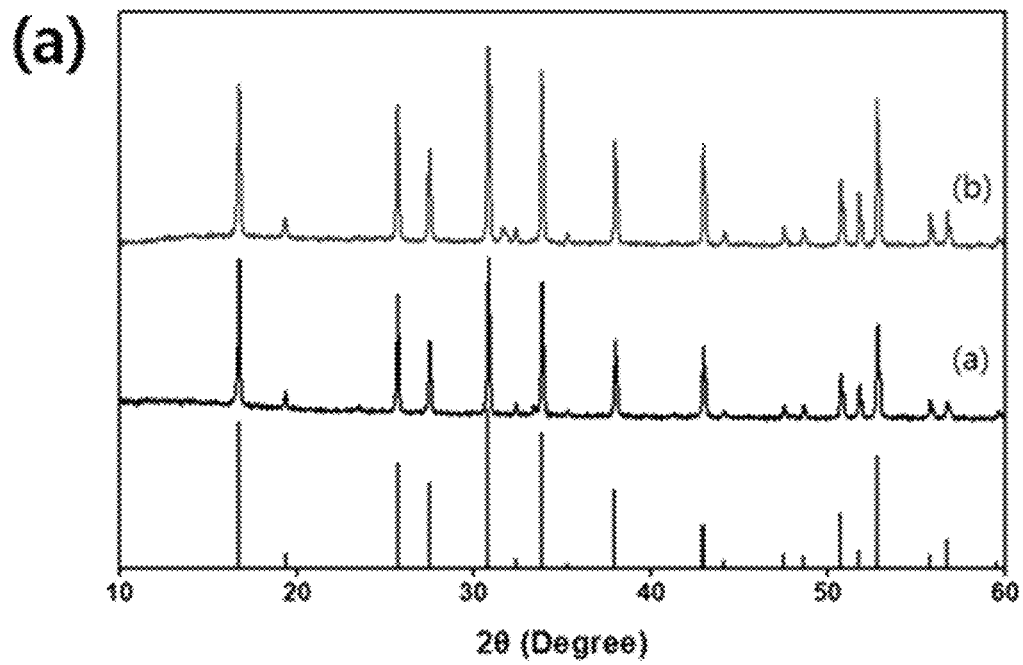
FIG. 7 shows (a) XRD results of the solid electrolyte and the sintered solid electrolyte obtained in Examples 9 and 12 and (b) impedance measurement results of the sintered solid electrolyte obtained in Example 12.
Figure 7:
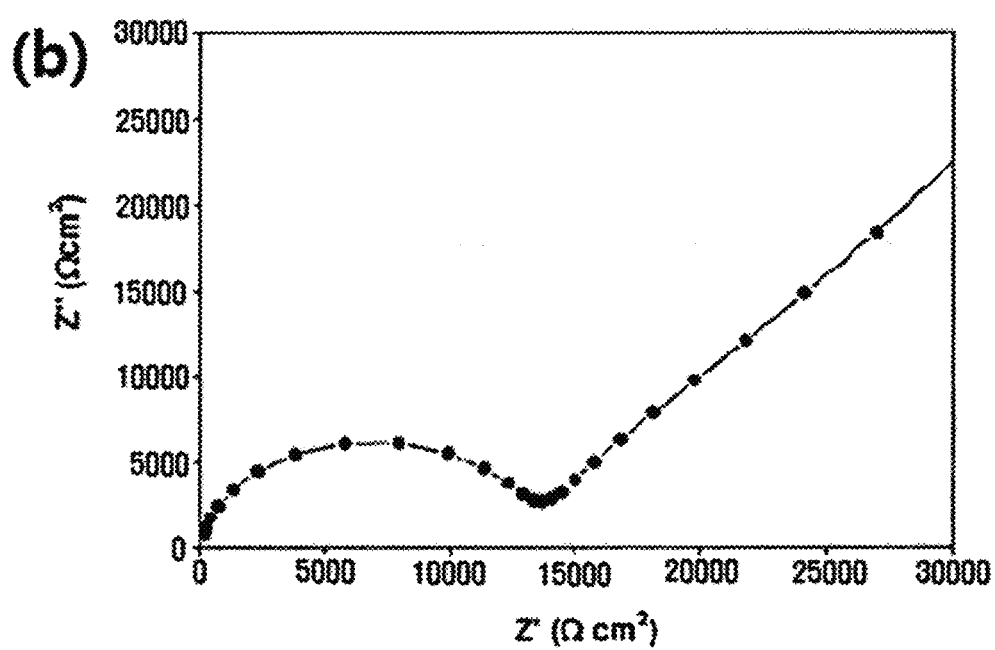

The XRD results of the solid electrolyte and the sintered solid electrolyte of Examples 9 and 12 are shown in FIG. 7(a), and the results of measurement of impedance of the sintered solid electrolyte of Example 12 are shown in FIG. 7(b).

With reference to FIG. 7(a), both the solid electrolyte and the sintered solid electrolyte of Examples 9 and exhibited the same cubic structure having almost no impurities. However, the ionic conductivity of the sintered solid electrolyte of Example 12 was 1.04×10⁻⁵ S/cm, which was relatively low compared to the sintered solid electrolytes of Examples 5 to 8.

With reference to FIG. 7(b), the resistance of the sintered solid electrolyte of Example 12 was about 14,000 Ω·cm, which was increased by at least 30 times over that of the sintered solid electrolyte of Example 5.

Therefore, the sintered solid electrolytes of Examples 5 to 8 were deemed to exhibit outstanding ionic conductivity and to have a single-phase cubic structure having almost no impurities. Also, the sintered solid electrolyte of Example 5 manifested the greatest ionic conductivity and impedance properties.

The scope of the invention is represented by the claims below rather than the aforementioned detailed description, and all of the changes or modified forms that are capable of being derived from the meaning, range, and equivalent concepts of the appended claims should be construed as being included in the scope of the present invention.

INDUSTRIAL APPLICABILITY

According to the present invention, the method of preparing the solid electrolyte can improve the ionic conductivity of the solid electrolyte by adjusting the aluminum content of the starting material to thus control sintering properties and also by adjusting the composition of the precursor and the lithium source to thus control the crystal structure.

What is claimed is:

1. A method of preparing a solid electrolyte, comprising:
   (a) preparing a solid electrolyte precursor slurry by subjecting a mixed solution comprising a metal precursor solution, including a lanthanum precursor, a zirconium precursor and an aluminum precursor, a complexing agent, and a pH controller to coprecipitation;
   (b) preparing a solid electrolyte precursor by washing and drying the solid electrolyte precursor slurry;
   (c) preparing a mixture by mixing the solid electrolyte precursor with a lithium source; and
   (d) preparing an aluminum-doped lithium lanthanum zirconium oxide (LLZO) solid electrolyte by calcining the mixture;
   wherein the coprecipitation in step (a) is carried out in a Taylor vortex state.

2. The method of claim 1, wherein the LLZO solid electrolyte is represented by Chemical Formula 1 below:

$$Li_xLa_yZr_zO_{12} \qquad \text{[Chemical Formula 1]}$$

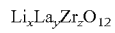

wherein 6≤x≤9, 2≤y≤4, and 1≤z≤3.

3. The method of claim 2, wherein the aluminum-doped lithium lanthanum zirconium oxide (LLZO) solid electrolyte includes lithium and aluminum at a weight ratio ranging from 100:0.01 to 100:20.

4. The method of claim 1, wherein step (a) is carried out using a Couette-Taylor vortex reactor.

5. The method of claim 4, wherein a Taylor number in the Taylor vortex state is 550 to 1,500.

6. The method of claim 5, wherein the Taylor number in the Taylor vortex state is 630 to 800.

7. The method of claim 1, wherein the lanthanum precursor is lanthanum nitrate, the zirconium precursor is zirconium nitrate, and the aluminum precursor is aluminum nitrate.

8. The method of claim 7, wherein the lanthanum nitrate is La(NO₃)₃·6H₂O, the zirconium nitrate is ZrO(NO₃)₂·2H₂O, and the aluminum nitrate is Al(NO₃)₃·9H₂O.

9. The method of claim 1, wherein a La:Zr:Al molar ratio in the metal precursor solution is a:b:c, a ranging from 2 to 4, b ranging from 1 to 3, and c ranging from 0.2 to 0.4.

10. The method of claim 9, wherein the La:Zr:Al molar ratio in the metal precursor solution is a:b:c, a ranging from 2 to 4, b ranging from 1 to 3, and c ranging from 0.2 to 0.3.

11. The method of claim 1, wherein a lithium content of the lithium source in step (c) is 101 to 112 parts by weight based on 100 parts by weight of lithium of the solid electrolyte, which is a product of step (d).

12. The method of claim 11, wherein the lithium content of the lithium source in step (c) is 101 to 108 parts by weight based on 100 parts by weight of lithium of the solid electrolyte, which is the product of step (d).

13. The method of claim 1, wherein the calcining in step (d) is performed at 600 to 1,000° C.

14. The method of claim 13, wherein the calcining is performed for 1 to 12 hr.

15. The method of claim 14, wherein the calcining is performed for 1 to 9 hr.

16. The method of claim 1, further comprising (e) preparing a sintered solid electrolyte by sintering the aluminum-doped LLZO solid electrolyte, after step (d).

17. The method of claim 16, wherein the sintering is performed at 900 to 1,300° C.

18. The method of claim 1, wherein the solid electrolyte has at least one structure selected from among a cubic structure and a tetragonal structure.

\* \* \* \* \*